Figure 1:
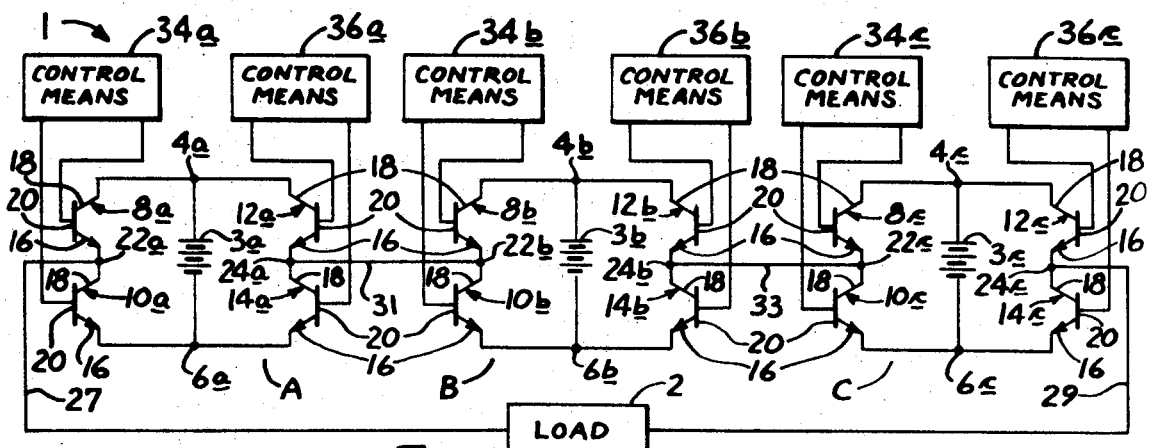

United States Patent

[11] 3,579,081

[72] Inventor James W. Bates
Palos Veres Estates, Calif.
[21] Appl. No. 774,660
[22] Filed Nov. 12, 1968
[45] Patented May 18, 1971
[73] Assignee Gulton Industries, Inc.
Metuchen, N.J.

[54] LOW FREQUENCY SINE WAVE GENERATOR CIRCUIT
17 Claims, 30 Drawing Figs.

[52] U.S. Cl. .................................................. 321/9,
307/227, 307/261, 321/27, 328/14, 328/27,
328/186
[51] Int. Cl. .................................................. H02m 1/12,
H02m 7/00
[50] Field of Search .................................................. 307/227,
261, 229; 328/13, 14, 23, 27, 186; 321/5, 9, (SW),
27

[56] References Cited
UNITED STATES PATENTS
| | | | |
|---|---|---|---|
| 2,912,634 | 11/1959 | Peoples | 321/5 |
| 3,002,142 | 9/1961 | Jensen | 321/9 |
| 3,227,889 | 1/1966 | Paynter | 307/261X |
| 3,340,469 | 9/1967 | Catherall et al. | 328/27X |
| 3,419,780 | 12/1968 | Vergez, Jr. | 321/5X |
| 3,491,282 | 1/1970 | Heinrich et al. | 307/261X |

*Primary Examiner*—Stanley D. Miller, Jr.
*Attorney*—Wallenstein, Spangenberg, Hattis and Strampel ABSTRACT: A sinusoidal signal generator circuit comprising at least two bridge circuits each comprising two pairs of series-connected bidirectional current control means connected across a source of direct current DC voltage, each bridge circuit having a pair of output terminals at the juncture of the current control means said pairs of current control means at very low frequencies like 60 cycles per second being connected directly in series. The noncorresponding current control means of the pairs of current control means of each bridge circuit are rendered nonconductive sequentially and in different combinations to produce different rectangular pulse output waveforms at the output terminals of said bridge circuit, each waveform respectively comprising positive and negative going pulses of the same amplitude relative to zero, the pulses of the different waveforms each cycle preferably being different in number and phase and of different magnitude, so the waveforms combine in both additive and subtractive relation to produce a resultant stepped sinusoidallike resultant waveform.

INVENTOR
JAMES W. BATES

INVENTOR
JAME W. BATES

INVENTOR
JAMES W. BATES

INVENTOR
JAMES W. BATES

LOW FREQUENCY SINE WAVE GENERATOR CIRCUIT

This invention relates to apparatus for generating relatively low frequency sine wave signals from a source of direct current, using relatively compact, light-in-weight components.

The present invention has its most important application in direct current powered sine wave power supplies capable of delivering substantial amounts of power for various applications, such as power supplies for satellites and aircraft, where size, weight and/or cost limitations are important considerations.

The generation of low frequency sine wave current of substantial magnitude generally requires extremely bulky equipment, whether it be an electromechanical device, such as motor generator equipment, or electronic circuits. Electronic circuits commonly generate sine wave current from the output of a direct current energized square wave generator circuit whose output appearing across the output of a transformer is filtered to provide a substantially sinusoidal waveform. A more recent development in electronic sine wave generator circuits produce an approximation of a sine wave signal by the superpositioning of a number of square topped pulses of varying width and instantaneously of the same polarity. The pulses are generally added together by connecting in series the secondary windings of a number of transformers whose primary windings are supplied with the pulses to provide a stepped waveform whose general outline resembles a sine wave. Transformers capable of handling substantial amounts of power at frequencies between about 60–400 cycles per second are very heavy and bulky. Other electronic sine wave generators have been developed which cannot operate with inductive loads.

Accordingly, one of the objects of the present invention is to provide a power supply capable of generating sinusoidal currents at low frequency and high power levels and which is relatively small and light in weight.

Another object of the invention is to provide a sinusoidal power supply as described which comprises a minimum number of parts;

A further object of the invention is to provide a power supply as described which can be operated reliably with resistive or inductive loads;

A still further object of the invention is to provide sinusoidal power supplies as described above which are energized from low voltage batteries and produce sinusoidal voltages of relatively large amplitude with equipment of modest size, weight, and/or cost.

Where sinusoidal power of the order of magnitude of 60 cycles per second is to be electronically generated to eliminate the necessity for low frequency load current carrying transformers, the power supply of the invention, comprises a series of bridge circuits each of which most advantageously comprises two pairs of current control devices, preferably power transistors, connected in series across the terminals of a source of DC voltage to pass load current therethrough which is a different source of DC voltage than that used for the other bridge circuit or circuits. The output of each bridge circuit is taken at the juncture of each pair of transistors. The outputs of the bridge circuits are connected directly in series with one another and a load which may be a resistive or inductive load. When any pair of noncorresponding transistors of the pairs of transistors of any bridge circuit connected to a load are driven into conduction, there is a finite bridge circuit output of given polarity depending on the particular noncorresponding pair of transistors rendered conductive. The base electrodes of the various transistors of each bridge circuit are driven by properly timed signals so that each bridge circuit produces at its output a rectangular pulse waveform which, when added to the output of the other bridge circuits, results in a stepped waveform resembling a sinusoidal waveform (or other desired waveform). When the outputs of the bridge circuits described are connected directly in series, it has been found necessary to have current continuity between the bridge circuits under inductive load conditions, or under conditions where the outputs of any two bridge circuits are to be in polarity opposition, or when any one of the bridge circuits has a zero output. In any such case, the transistors must either have an appreciable gain in both directions of possible current flow therethrough (i.e., they conduct substantially in both directions) or else rectifiers must be placed across each transistor capable of carrying the reverse current which the transistor cannot carry if it does not have a substantial reverse gain. By connecting the outputs of these bridge circuits directly in series, no transformers are required and a stepped waveform approximating that of a low frequency sinusoidal waveform can be readily obtained under inductive or resistive load conditions and with equipment which is amazingly compact and light-in-weight.

In accordance with another aspect of the invention, only a few bridge circuits or other rectangular pulse-forming circuits are required to provide a waveform with a much larger number of steps resembling a sinusoidal waveform. For example, two square (i.e. rectangular) pulse waveforms can produce a nine step sinusoidal waveform (i.e. nine steps per half cycle) if they have different amplitudes and change polarity at different times so they are sometimes in additive and sometimes in subtractive relationship within each half cycle. For example, if the amplitude of one of the waveforms is approximately three times that of the other, a resultant eight step sinusoidal voltage waveform can be achieved when the magnitude of the waveforms change sequentially in the following way: 0+0, 0+1, 3−1, 3+0, 3+1, 3+0, 3−1, 0+1, 0+0 (end of first half cycle) 0+0, 0−1, −3+1, −3+0, −3−1, −3+0, −3+1, 0−1, and 0+0.

In the circuit just described, the source of DC voltage associated with each bridge circuit must be isolated from the other sources of DC voltage. Consequently, when the circuit is energized from a low voltage battery, the sources of DC voltage associated with the different bridge circuits are normally separate DC to DC converter circuits which stepup the output of the low voltage battery to different higher voltage values. Each of these converter circuits generally include transistors, an output transformer, rectifiers, filter chokes and filter capacitors. It was surprisingly discovered that, at a medium low frequency like 400 cycles per second, an increase in reliability and a decrease in weight results in the embodiment of the invention described in the last paragraph if the lower output bridge circuit whose output varies in polarity a number of times each half cycle is energized from the same source of DC voltage as the other higher output bridge circuit so it produces pulses of the same magnitude as said other bridge circuit, and the output of the previously higher output bridge circuit is connected in series with the secondary winding of a stepdown transformer whose primary winding is connected to the output terminals of the previously lower output bridge circuit. Thus, if the source of DC voltage energizing the former bridge circuit is 120 volts, the input DC voltage energizing the other bridge circuit will also be 120 volts so that the initial output thereby comprises pulses varying a number of times each half cycle between positive and negative 120 volts. These pulses are stepped down to 40 volts through the stepdown transformer referred to. Because of the varying polarity of the pulses each half cycle, the average flux in the core of the stepdown transformer is so unexpectedly low that the transformer can have such a much smaller size, such as a size normally required for a transformer operating at 1,600 cycles per second, that a substantial increase in reliability and decrease in size, weight and cost results. Normally, a stepdown transformer designed for 400 cycles per second operation at the power levels involved would require such a large, heavy transformer that its use instead of a converter circuit would be disadvantageous.

Figure 3:
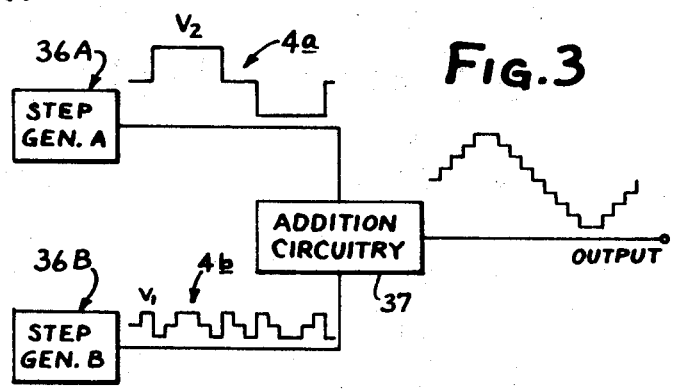
Figure 4:
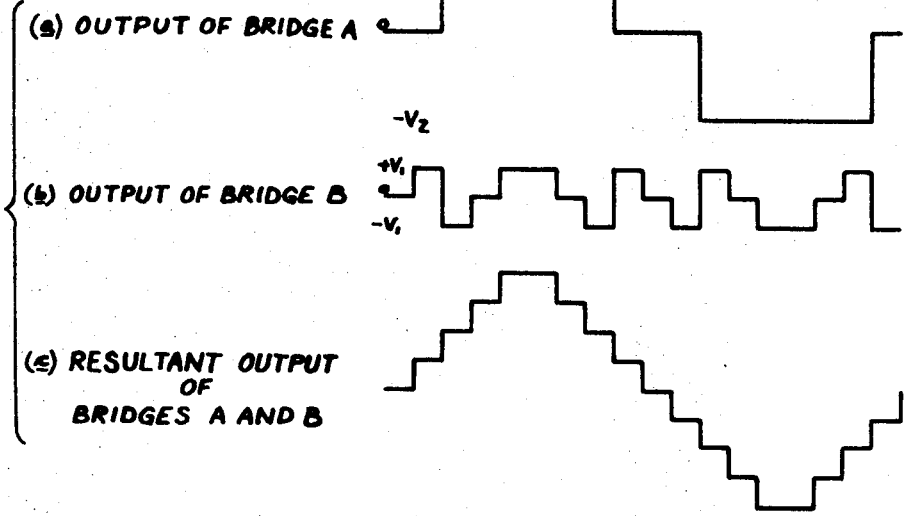
Figure 5:
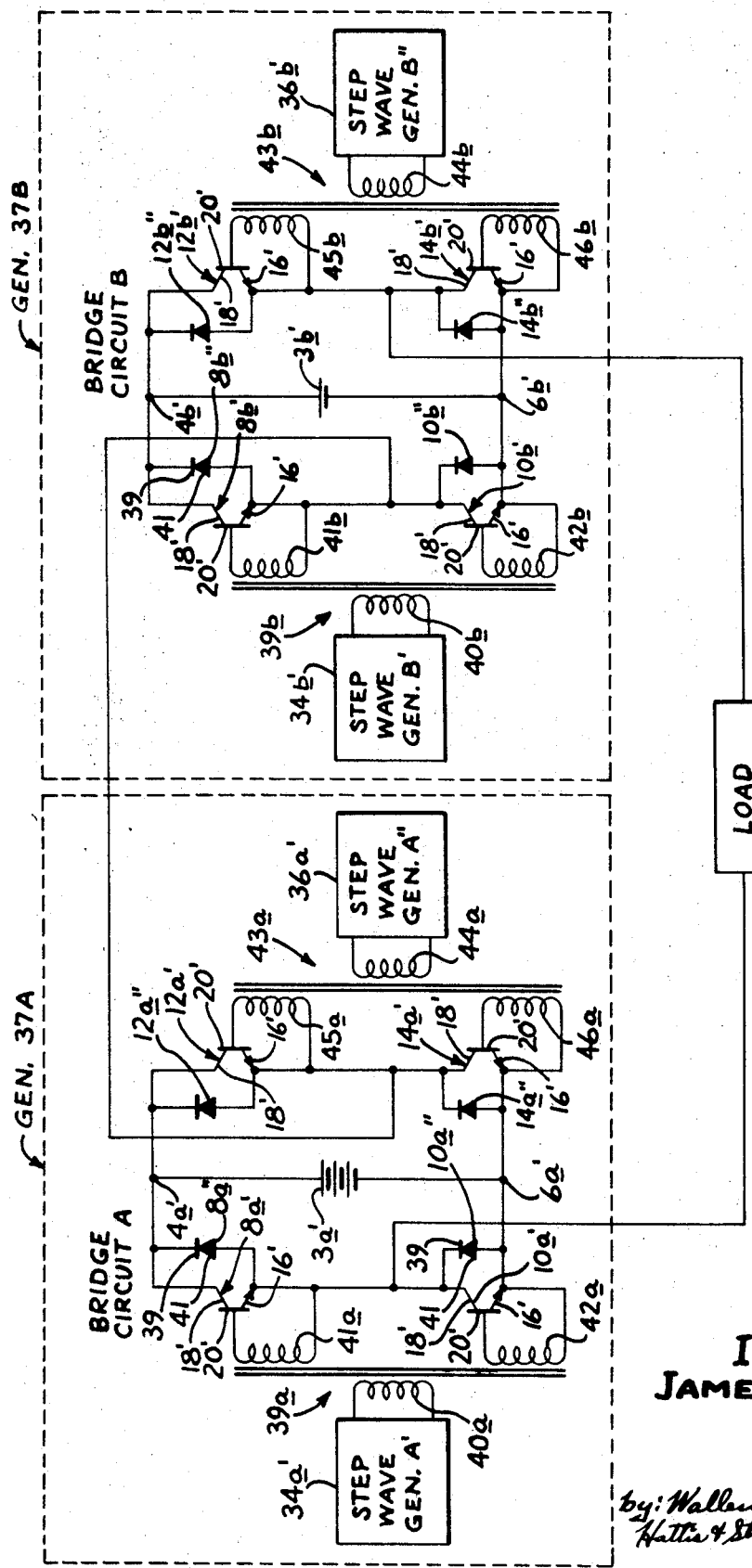
Figure 6:
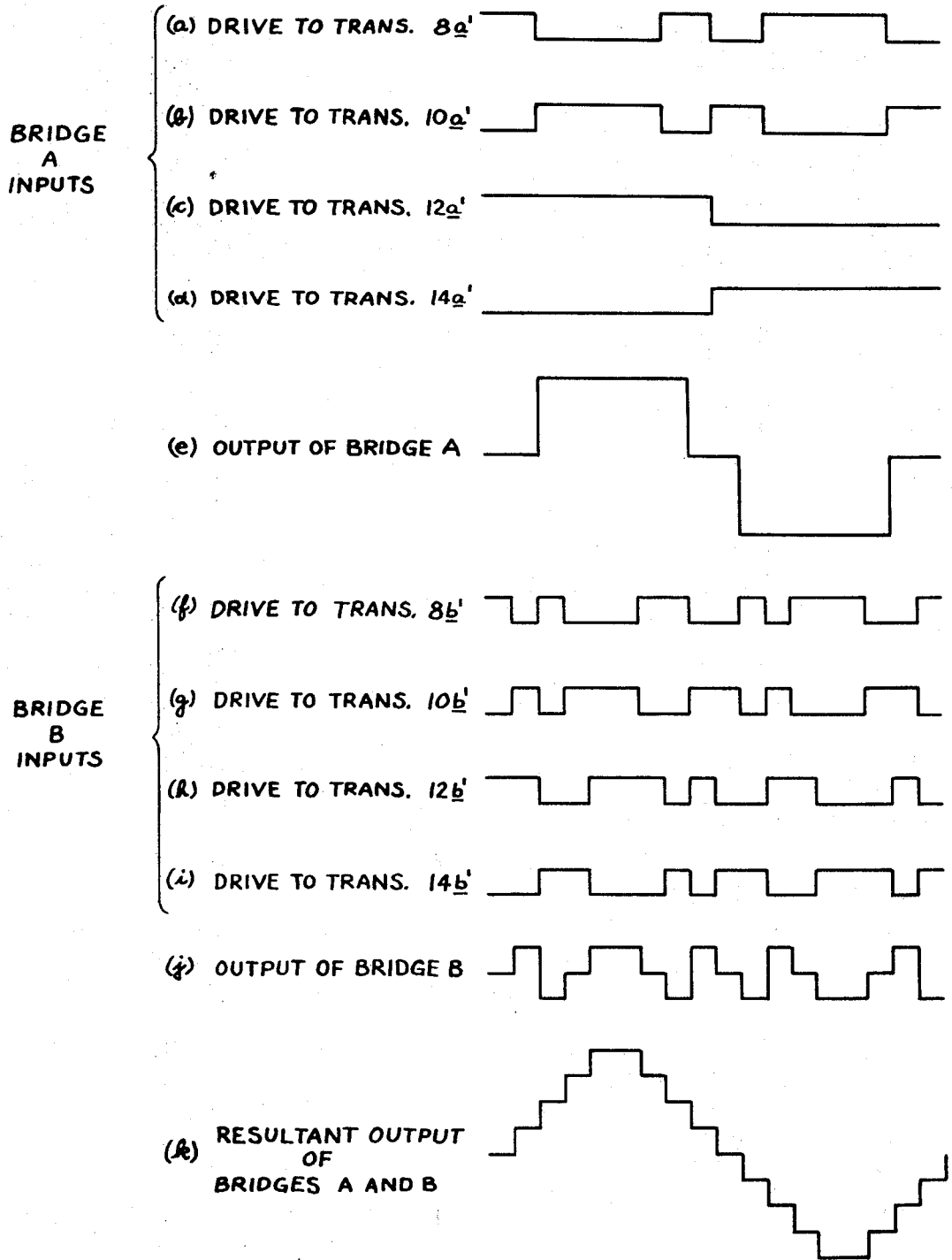
Figure 7A:
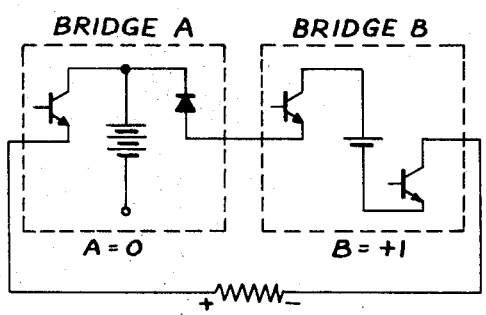
Figure 7B:
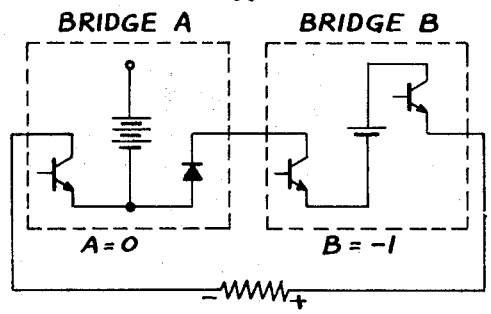
Figure 7C:
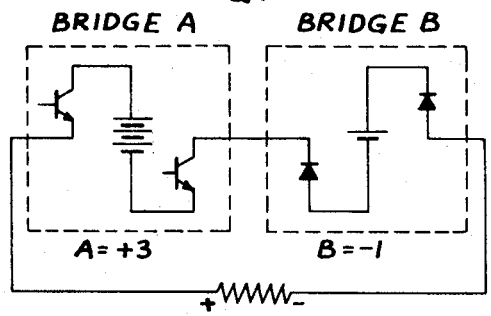
Figure 7D:
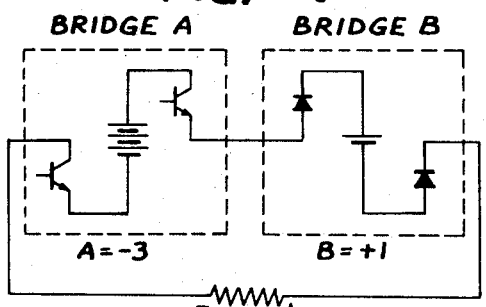
Figure 7E:
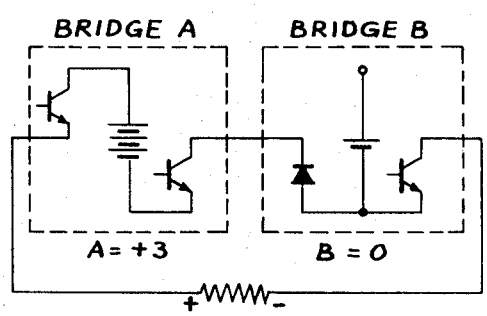
Figure 7F:
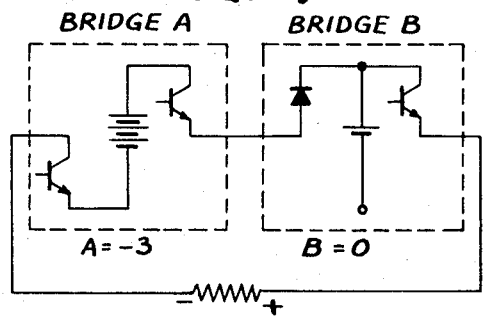
Figure 7G:
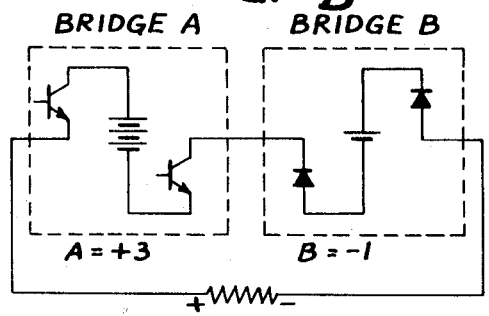
Figure 7H:
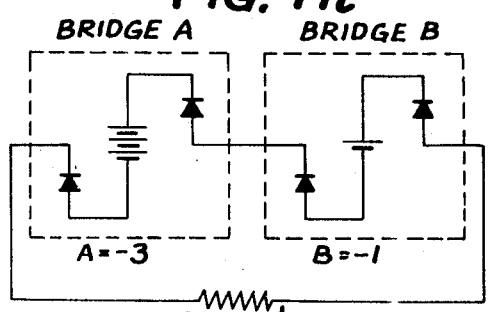
Figure 8:
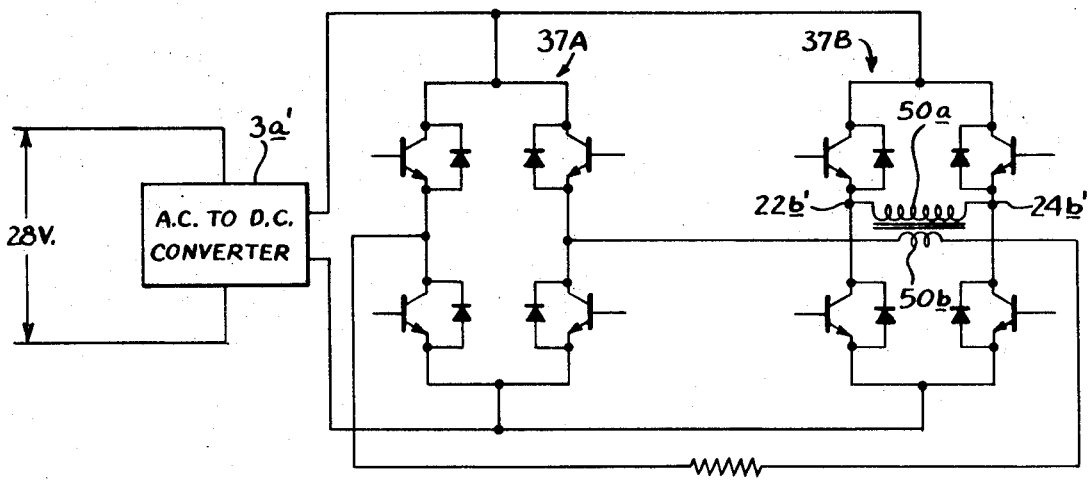
Figure 9:
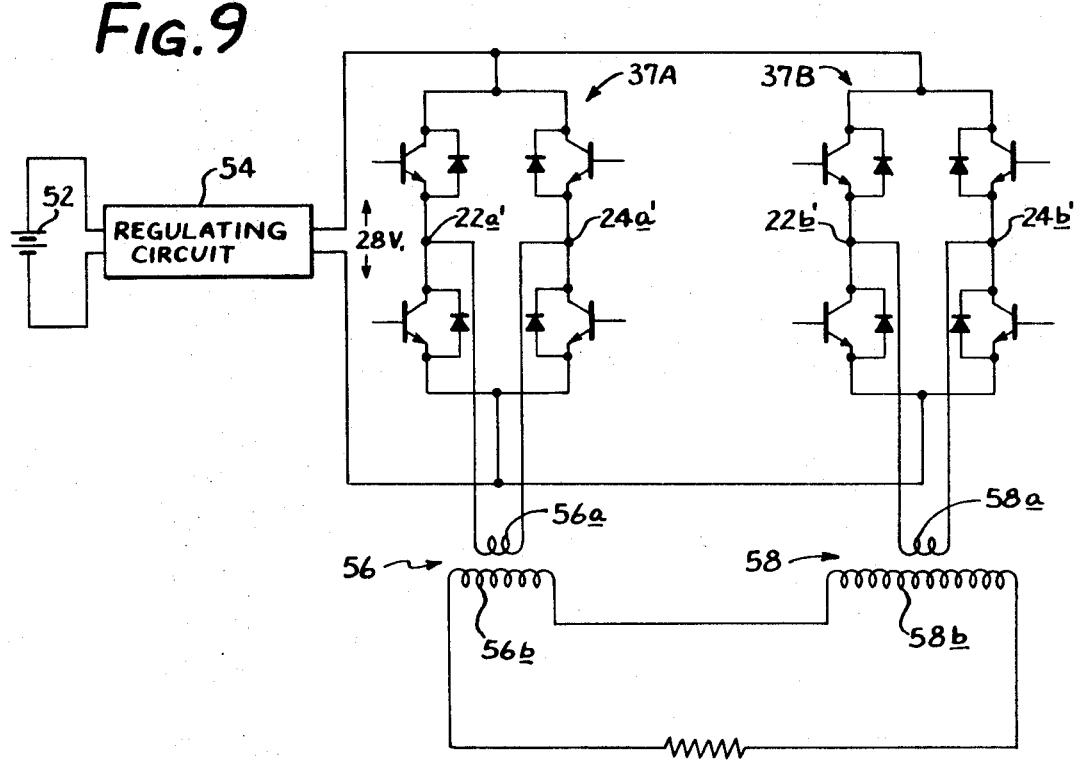

The above and other objects, advantages and features of the invention will become apparent by making reference to the specification to follow, the claims and the drawings wherein:

FIG. 1 is a simplified diagram of a series of three square pulse generating bridge circuits designed and interconnected in accordance with the present invention to provide a stepped waveform resembling a sine wave;

FIGS. 2a, b, c and d are waveforms which respectively show the three individual outputs of the bridge circuits shown in FIG. 1, and the summation of these outputs constituting the voltage applied to the load circuit of FIG. 1, all drawn on a common time base;

FIG. 3 is a simplified block diagram illustrating two square pulse generating circuits having outputs which, in accordance with another aspect of the invention, when added together, produce a stepped waveform which resembles the outline of a sine wave;

FIGS. 4a, b and c show the outputs of the pulse generating circuits of FIG. 3 and the summation thereof drawn on a common time base;

FIG. 5 illustrates the preferred circuitry for carrying out the form of the invention shown in FIG. 3 at very low frequencies;

FIG. 6a, b, c, d, e, f, g, h, i, j, and k show the waveforms of the various input and output voltages in the circuit of FIG. 5;

FIG. 7 a, b, c, d, e, f, g and h illustrate schematically the various circuit paths in the signal generator circuit of FIG. 5 during different time intervals when the outputs of the bridge circuits of FIG. 5 add in various different ways to produce the resultant sinusoidal stepped waveform of FIG. 6k;

FIG. 8 is a modification of the circuit of FIG. 6 which is preferred at medium frequencies; and, FIG. 9 is a still further modification of the circuit of FIG. 6 which is preferred where minimum cost is the prevailing factor and weight is a minor factor.

Figure 2:
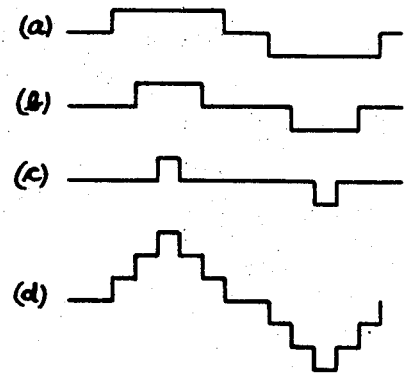

Referring now more particularly to FIGS. 1 and 2, the sinusoidal waveform generating circuit 1 thereshown is useful where it is desired to eliminate very low frequency (e.g. 60 cycles per second) load current carrying transformers. The circuit 1 has three bridge circuits A, B and C connected directly (i.e., through conductors rather than transformers) in series circuit relationship with a load 2 which may be a resistive or inductive load. (In accordance with the broadest aspect of the bridge circuit embodiment of the invention, there could be as few as two bridge circuits of any number of bridge circuits depending upon the number of steps desired in the output of the circuit 1.) Each of the bridge circuits includes a source of DC voltage 2a, 3b or 3c connected across one of the pairs of bridge input terminals 4a–6a, 4b–6b or 4c–6c. The sources of DC voltages 3a, 3b and 3c are independent voltage sources with isolated outputs. Where a battery powered vehicle is involved, the sources of DC voltage would each normally comprise a DC to DC converter circuit which steps up the low voltage output of the battery involved to a much higher voltage. The sources of DC voltage 3a, 3b and 3c may have outputs of the same or different magnitudes. In the example of the invention now to be described, it will be assumed that the outputs of all of these sources of DC voltage are equal.

Each bridge circuit has a first pair or series connected current control devices 8a–10a, 8b–10b or 8c–10c connected in series across the associated bridge input terminals. Each bridge circuit further has a second pair of series connected current control devices 12a–14a, 12b–14b or 12c–14c connected in series across the associated bridge input terminals. Although, theoretically, the current control devices referred to could be pairs of relay contacts, in accordance with the most practical and commercially important form of the invention, each of these current control devices are three-terminal devices, such as power transistors each having emitter, collector and base electrodes 16, 18 and 20, the emitter and collector electrodes of each associated pair of transistors being connected in series across the associated bridge input terminals. In the form of the invention illustrated in FIG. 1, the various transistors illustrated are transistors having a substantial gain in either direction of current flow therethrough. That is, assuming that the transistors are NPN transistors, substantial current will flow between the emitter to collector or the collector to emitter electrodes whether the emitter or collector electrodes are connected to the positive or negative terminal of a source of DC voltage, provided the base electrode is connected to a positive source of voltage. (In the case of a PNP transistor, the base electrode must be connected to a negative voltage to enable the transistor to conduct in either direction.)

The output of each bridge circuit is taken across a pair of output terminals 22a–24a, 22b–24b or 22c–24c, respectively, connected between the points of juncture of the associated pairs of transistors. A conductor 27 connects one of the output terminals 22a of one of the outermost bridge circuits A to one of the terminal of the load 2 and a conductor 29 connects the output terminal 24c of the other outermost bridge circuit C to the other terminal of the load 2. A conductor 31 connects the output terminal 24a of the bridge circuit A to the output terminal 22b of the intermediate bridge circuit B. Similarly, a conductor 33 connects the output terminal 24b of the bridge circuit B to the output terminal 22c of the bridge circuit C.

As illustrated in FIG. 1, the base electrodes 20 of the transistor pairs 8a–10a, 8b–10b and 8c–10c of bridge circuits A, B and C are respectively connected to separate control means 34a, 34b and 34c, each of which produce voltages at the points to which the base electrodes of the associated pairs of transistors are connected which are 180° out of phase, so that one or the other of the transistors involved will be conductive while the other is nonconductive at any given time (except during the instants when the conductive conditions thereof are being reversed). Similarly, the base electrodes 20 of the associated pairs of transistors 12a–14a, 12b–14b and 12c–14 are respectively connected to associated control means 36a, 36b and 36c, each of which generates voltages at the points to which the base electrodes of the associated pairs of transistors are connected which are 180° out of phase so that one or the other of the transistors involved will be conductive while the other is nonconductive at any given time. In general, the control means associated with any given bridge circuit will generate voltages having different waveforms and phase, to produce an output voltage across the associated bridge output terminals corresponding with a desired waveform, such as one of the waveforms shown in FIGS. 2a, b or c. (The correspondingly numbered control means of the various bridge circuits A, B and C will, in general, generate different voltage waveforms since the output of the associated bridge circuits will have different waveforms).

When the noncorresponding pairs of transistors 8a–14a, 8b–14b or 8c–14c are conductive, the associated bridge output terminal 22a, 22b or 22c will be positive with respect to the associated bridge output terminals 24a, 24b or 24c. When the noncorresponding pairs of transistors 10a–12a, 10b–12b or 10c–12 are conductive, the associated bridge output terminal 22a, 22b or 22c will be negative with respect to the associated bridge output terminal 24a, 24b or 24c. The noncorresponding transistors of bridge circuit A, B or C could not be rendered conductive unless there was continuity between the bridge output terminal through a load circuit which includes the other bridge circuits. Corresponding pairs of transistors 8a–12a, 8b–12b, 8c–12c, 10a–14a, 10b–14b or 10c–14c of bridge circuit A, B or C can be rendered conductive only if the transistors are of the bidirectional type, since one of the transistors must then carry a reverse current, and only if there is a voltage applied to the emitter and collector electrodes from another bridge circuit. In the circuit of FIG. 1, the transistors must be bidirectional also even when noncorresponding transistors are rendered conductive where the load 2 has a substantial inductive reactance because, in such case, the current and voltage across a transistor are out of phase so a current reversal takes place before a voltage reversal takes place. Any one of a number of desired square-topped pulse waveforms can be provided across the associated bridge output terminals varying between zero and a positive or negative voltage corresponding to the magnitude of the output of the associated source of DC voltage 3a, 3b or 3c. In the example of the invention illustrated in FIG. 2, when the control means 34a–36, 34b–36b and 34c–36c provide properly timed voltages at the outputs thereof, voltage waveforms like that shown in FIGS. 2a, b and c, can be readily obtained at the outputs of the bridge circuits A, B and C which add together to provide the stepped waveform shown in FIG. 2d appearing across the output conductors 27 and 29 leading to the load 2. Note that the bridge output waveforms are of the same polarity each half cycle and are centered square pulses of different width. This resultant waveform resembles generally the outline of a sine wave when the steps of the waveform are filtered out. Obviously, the greater the number of steps in the waveform involved, the closer the waveform resemble an ideal sine wave.

The proper continuity of current between the various series connected bridge circuits A, B and C could not be achieved unless the current control devices utilized in the bridge circuits were bidirectional. This is achieved in the embodiment of the invention shown in FIG. 1 by selecting transistors which are bidirectional, that is, which have a reverse gain as above explained. (However, a more efficient circuit results if the transistors shown in FIG. 1 are normal transistors having a very low reverse gain and the emitter and collector electrodes thereof are shunted by a reverse connected rectifier, as in the case of the bridge circuit shown in FIG. 5, which will be described later on in the specification.)

The form of the invention shown in FIG. 1, where the outputs of the three bridge circuits are as shown in FIGS. 2a, b and c, produces a stepped sinusoidal waveform having three steps in each half cycle thereof. In accordance with another aspect of the present invention, one or more additional steps in the output waveform can be achieved with a reduction in the number of square-topped pulse waveforms added together by the unique combination of waveforms like that shown in FIGS. 3, 4a and 4b, to which reference should now be made. A shown, one of the waveforms shown in FIG. 4a varies between 0 and + $V_2$ or minus $V_2$ in any given half cycle while the other waveform shown in FIG. 4b varies a number of times between 0, + $V_1$ and minus $V_1$, where $V_2$ is much greater than $V_1$, preferably $3V_1$. In such case, as illustrated, where $V_2$ is 3 units and $V_1$ is one unit, the following sequential combinations of 0 units + 3 units − 3 units of one of the waveforms, and 0 units + 1 unit and − 1 unit of the other waveform can produce stepped sinusoidal waveform with the following sequential combinations of waveforms values: 0+0, 0+1, 3−1, 3+0, 3+1, 3+ 3−1, 0+1, 0+0(end of first half cycle), 0+0, 0−1, −3+1, −3−0, −3−1, −3+0, −3+1, 0−1 and 0+0.

As indicated by FIG. 3, in accordance with a broad aspect of the invention, any suitable generators 36A and 36B may be used to produce the waveforms 4a and 4b, and any summing circuit 37 may be used to sum these waveforms. However, the most preferred form of the invention is shown in FIG. 5 for very low frequency (e.g. 60 cycles per second) applications where no load current carrying transformer can be tolerated. As these shown, the square-topped pulse generators 37A and 37B are bridge circuits similar in many respects to the bridge circuits A and B shown in FIG. 1, and corresponding elements have been similarly numbered except for the addition of a prime (') after the reference number involved. Accordingly, as above indicated, the source of DC voltage 3a' of the bridge circuit 37A has an output preferably three times that of the source of DC voltage 3b' of the bridge circuit 37B. The various transistors in the bridge circuits 37A and 37B are power transistors which do not have a significant reverse gain, and there is connected across the emitter and collector electrodes of each of the power transistors involved a reverse current carrying rectifier 8a''', 10a''', 12a''', 14a''', 8b''', 10b''', 12b'' or 14b'' where the cathode electrode 39 of each rectifier is connected to the collector electrode 18' of the associated transistor and the anode electrode 41 of each rectifier is connected to the emitter electrode 16' of the associated transistor. (In some of the claims, reference to a current controlling means capable of conducting current in both directions is intended to cover any one of a number of bidirectional means including a transitor with a reverse gain of substantial magnitude, as in the case of the FIG. 1 embodiment, or a two-element unit comprising a unidirectional conducting transistor shunted by a reverse connected rectifier, as in the case of the FIG. 5 embodiment.)

Each bridge circuit shown in FIG. 5 operates similarly to each of the bridge circuits shown in FIG. 1 except that reverse current flow occurs through the various rectifiers referred to rather than through the transistors themselves.

As in the case of the bridge circuit shown in FIG. 1, the base electrodes 20' of each left-hand pair of transistors 8a'−10a', and 8b'−10b' are associated respectively with current control means 34a' and 34'b. Similarly, the right-hand pair of transistors 12a'−14a' and 12b'−14b' are associated respectively with control means 36a' and 36b'.

The control means 34a' in the bridge circuit 37A in FIG. 5 is a generator having an output transformer 39a with a primary winding 40a, and a pair of secondary windings 41a and 42a in which is respectively induced the square-topped waveforms shown in FIGS. 6a and b, which are the same waveforms 180° out of phase. The secondary winding 41a is connected between the base and emitter electrodes 20' and 16' of the transistor 8a ' and the secondary winding 42a is connected between the base electrode 20' and the emitter electrode 16' of the transistor 10a'.

The control means 36a' of the bridge circuit 37A has an output transformer 43a with a primary winding 44a and a pair of secondary windings 45a and 46a in which are respectively induced the waveforms shown in FIG. 6 c and d which are waveforms 180° out of phase. The transformer secondary winding 45a is connected between the base and emitter electrodes 20' and 16' of the transistor 12a' and the secondary winding 46a is connected between the base and emitter electrodes 20' and 16' of the transistor 14a'.

The control means 34b' associated with the bridge circuit 37B has an output transformer 39b with a primary winding 40b and a pair of secondary windings 41b and 42b in which are induced respectively the waveforms shown in FIGS. 6f and g which are 180° out of phase with one another. The secondary winding 41b is connected between the base and emitter electrodes of the transistor 8b' and the secondary winding 42b is connected between the base and emitter electrodes of the transistor 10b'.

The control means 36b' of the bridge circuit 37B is a generator having an output transformer 43b with a primary winding 44b and a pair of secondary windings 45b and 46b in which are respectively induced voltages having the waveforms shown in FIGS. 6h and i which are 180° out of phase with one another. With control signals fed to the base electrodes of the various transistors of the bridge circuit 37A like that shown in FIGS. a, b, c and d, the waveform shown in FIG. 6 e is produced at the output terminals of bridge circuit 37A and with the control signals fed to the base electrodes of the various transistors of the bridge circuit shown in FIGS. f, g, h and i, the waveform shown in FIG. 6j is produced at the output terminals of bridge circuit 37B.

The need for bidirectional current paths in the bridge circuits of the invention can best be understood by tracing the circuits shown in FIGS. 7a through 7h which show schematically the different portions of the bridge circuit which form conductive paths for current flow to the load 2 for the different combinations of current conduction of the transistors of the bridge circuits 37A and 37B.

It should be noted, that, when the bridge circuits 37A and 37B have finite outputs of the same polarity during the same intervals which are in additive rather than subtractive or opposing relation, the noncorresponding transistors in each bridge circuit involved supply current paths through the bridge circuits. However, when the output of a bridge circuit is zero or the bridge circuit 37B opposes the finite output of bridge circuit 37B, one or more rectifiers are conductive to supply current paths through the bridge circuits.

As previously indicated, the sources of DC voltage associated with the various bridge circuits shown in FIG. 5, are isolated from one another and generally comprise completely separate DC to DC converter circuits which convert the low voltage output of the basic power source, which may be a low voltage DC battery, to a much higher voltage which may be, for example, 120 volts in the case of the source of DC voltage 3a' and 40 volts in the case of the source of DC voltage 3b'. Each DC to DC converter circuit generally comprises transistors or with similar current control devices operating at a relatively high frequency so as to generate an alternating current in an output transformer of modest size because of the high frequency involved, rectifiers connected to the output transformer for converting the alternating output thereof to direct current, and suitable filter elements, such as a choke and capacitors providing a steady DC output. As previously indicated, it has been unexpectedly discovered that an increase in reliability and a decrease in the size, weight and complexity of the circuit shown in FIG. 5 is achieved at relatively low frequencies like 400 cycles per second by eliminating completely the source of DC voltage 3b, connecting the input terminals of bridge circuit 37B instead to the source of DC voltage 3a', disconnecting the output terminals of bridge circuit 37B from the output of the bridge circuit 37A and providing a stepdown transformer 50 having a primary winding 50a connected across the output terminals of the bridge circuit 37B and a secondary winding 50b connected in series with the output terminals of the bridge circuit 37A, as shown in FIG. 8. Although normally it would be expected that the transformer 50 required in the circuit of FIG. 8 at the modestly low frequencies of 400 cycles per second would be relatively heavy and bulky, it was discovered that an exceedingly small transformer was required which weighed much less than the sum of the various components which formed the DC to DC converter portion of the source of DC voltage 3b' in FIG. 5. Also, the much fewer parts required increases the reliability and reduces the cost of the circuit. It was discovered, for example, that the size of the transformer 50 required was one which would ordinarily be required for a frequency of 1,600 cycles per second in the example being illustrated. The reason for this unexpectedly small size of the transformer 50 is that the current varies in direction through the transformer windings each half cycle so that the average flux in the core over each half cycle is very low.

Where cost rather than weight considerations are paramount, the circuit of FIG. 9 is preferred. In this circuit, all DC to DC converters circuits are eliminated and both bridge circuits 37A and 37B are energized from a source of low amplitude DC voltage including a low voltage battery source 52 and suitable voltage regulating circuitry 54 which establishes a regulated DC voltage of, for example, 30 volts or less. (The sources of DC voltage 3a, 3b, 3a', 3b', etc. referred to in the previous circuits would, for battery-powered applications, likewise comprise a low voltage battery like 52 and a regulator circuit like 54.) The bridge circuits 37A and 37B which are connected in parallel across the output of the regulating circuit 54 are operated in the same manner as the similarly numbered bridge circuits 37A and 37B in FIG. 5, except that the output terminals therein are respectively connected to step-up transformers 56 and 58. The step-up transformer 56 has a primary winding 56a connected across the bridge output terminals 22a'-24a' of bridge circuit 27A and a secondary winding 56b into which is induced alternating rectangular pulses having an amplitude, for example, plus and minus 120 volts. The step-up transformer 58 has a primary winding 58a connected across the bridge output terminals 22b'-24b' of the bridge circuit 37B and a secondary winding 58b into which is induced alternating rectangular pulses as described of plus and minus 40 volts. The secondary windings 56b and 58b are connected in series with the load 2.

The circuits of FIGS. 8 and 9 just described are not generally useful at frequencies of the order of magnitude of 60 cycles per second because of the tremendously large size and weight of the transformer 56, in which substantial flux levels appear each half cycle, requiring a core of extremely large volume and weight. However, the circuit is a practical one for frequencies of the order of magnitude of 400 cycles per second since the transformer 56, although large and weighty, is of a tolerable size for applications where weight is not a primary consideration. The elimination of the many parts required for the DC to DC converters circuits results in a much less costly design.

It should be understood that numerous modifications may be made in the various forms of the invention described above without deviating from the broader aspects thereof.

I claim:

1. A signal generator circuit for providing a waveform which progressively cyclically increases and decreases in finite steps, the circuit comprising: at least a first and second pulse-forming circuit each providing a repetitive alternating rectangular pulse output wherein, during each cycle, at least some of the pulses in the waveform produced by each pulse-forming circuit start from 0 volts and have amplitudes of both positive and negative values; the widths of the positive and negative pulses of each pulse-forming circuit being different from that of the other of same so at least some of the pulses of one of the pulse-forming circuits have leading and trailing edges occurring at different instants of time than the other of same, each pulse-forming circuit producing a different number of positive and negative pulses over a cycle thereof than the other of same, and means for adding together the outputs of said pulse-forming circuits wherein the outputs thereof combine to provide a stepped waveform progressively cyclically increasing and decreasing in value and having a greater number of steps than the number of pulse-forming circuits.

2. The signal generator circuit of claim 1 wherein the output of one of said pulse-forming circuits varies in value between zero and said positive and negative values within each half cycle while the output of another pulse-forming circuit varies only between zero and a value of one polarity within the same half cycle.

3. A signal generator circuit for providing across a pair of output terminals a waveform which progressively cyclically increases the decreases in finite steps, the circuit comprising: at least a first and a second pulse-forming circuit each providing a repetitive rectangular pulse waveform in which successive half cycles are mirror images of one another and comprising spaced pulses at least some of which extend from a 0 amplitude reference, the waveform of said pulse-forming circuits respectively comprising different numbers of such pulses each half cycle with the waveform having the greater number of pulses having narrower pulses of substantially smaller amplitude than that of the other waveform and comprising each half cycle spaced pulses occurring while the other waveform is 0, at least one pulse occurring while the other waveform presents a pulse and presenting a 0 output while the other waveform presents a pulse so the instantaneous summation of said waveforms provide a resultant output waveform which progressively cyclically increases the decreases in steps which are greater in number than the number of pulse-forming circuits, and means for adding together the waveforms produced by said pulse-forming circuits to provide said resultant output waveform at said output terminals.

4. The signal generator circuit of claim 3 wherein the waveform produced by said pulse-forming circuit producing the greater number of pulses comprises pulses which vary in polarity each half cycle and the waveform produced by said other pulse-forming circuit comprises only one relatively wide pulse each half cycle.

5. The signal generator circuit of claim 4 wherein there is a point in said pulse-forming circuit producing the greater number of pulses where the amplitude of the pulses varying in polarity each half cycle are substantially identical to that of the pulse of the waveform at the output of the other pulse-forming circuit, and the pulse-forming circuit producing the greater number of pulses including a stepdown pulse transformer having a primary winding connected to said point in the same wherein the pulses vary in polarity each half cycle and a secondary winding connected directly in series with the output of the other pulse-forming circuit.

6. A signal generator circuit for providing a signal which progressively cyclically increases and decreases in finite steps, the signal generator circuit comprising: a source of DC voltage having a relatively low voltage output, a DC to DC converter circuit connected to the output of said source of DC voltage for providing a DC output voltage of substantially greater magnitude than said relatively low voltage output, first and second rectangular pulse-forming circuits connected to the output of said DC to DC converter circuit for respectively providing from the output of said converter circuit different rectangular pulse waveforms respectively comprising positive and negative going pulses of different width and varying between 0 and positive and negative values approximately equal to the output of said DC to DC converter circuit, and which waveforms when modified to have respectively different amplitudes provide a resultant waveform which progressively increases and decreases in steps, and a stepdown transformer having a primary winding coupled to the output of said pulse-forming circuit having the narrower pulses and a secondary winding connected directly in series with the output of the other pulse-forming circuit.

7. The signal generator circuit of claim 6 wherein said rectangular pulse waveform of the pulse-forming circuit having the narrower pulses comprises each half cycle pulses of alternating polarity having said positive and negative values so the average current flow is at or near 0.

8. A signal generator circuit for providing a signal which progressively cyclically increases and decreases in finite steps, the signal generator circuit comprising: a source of DC voltage having a relatively low voltage output, first and second rectangular pulse-forming circuits connected to the output of said source of DC voltage for respectively providing from the output of said converter circuit different rectangular pulse waveforms respectively comprising positive and negative going pulses varying of different widths between 0 and positive and negative values approximately equal to the output of said source of DC voltage, and which waveforms when modified to have respectively different amplitudes provide a resultant waveform which progressively increases and decreases in steps, and a pair of step-up transformers having primary windings respectively coupled to the output terminals of said pulse-forming circuits and secondary windings coupled in series circuit relationship, the step-up ratio of the transformer associated with said pulse-forming circuit having the narrower pulses being less then the other of same, wherein the summation of the positive and negative going pulses induced in said windings will produce a progressively increasing and decreasing stepped waveform.

9. The signal generator circuit of claim 8 wherein said rectangular pulse waveform of the pulse-forming circuit having the narrower pulses comprises each half cycle pulses of alternating polarity having said positive and negative values, and the rectangular pulse waveform of the other pulse-forming circuit comprises each half cycle one or more pulses having only one polarity.

10. A signal generator circuit for providing a waveform which progressively cyclically increases and decreases in finite steps to resemble a sinusoidal waveform, the circuit comprising at least first and second signal generators each providing a square pulse alternating output where the pulse varies between zero and positive and negative values of the same magnitude, the positive and negative values $+V_2$ and $-V_2$ of the output of one of the generators being substantially greater than the positive and negative values $+V_1$ and $-V_1$ of the other generator, and summing means for adding together the outputs of said signal generators, the instantaneous values of the outputs of said generators changing at different times to provide the following simultaneously occurring pairs of outputs in the sequence indicated which are added together by said summing means: $0+0$, $0+V_1$, $+V_2-V_1$, $+V_2+0$, $+V_2+V_1$, $+V_2+0$, $+V_2-V_1$, $0+V_1$, $0+0$, $0-V_1$, $-V_2+V_1$, $-V_2+0$, $-V_2-V_1$, $-V_2+0$, $-V_2+V_1$, $0-V_1$, and $0+0$, to provide a stepped waveform progressively increasing and decreasing in value.

11. The signal generator circuit of claim 10 wherein $V_2$ is $3V_1$ and there are only two of said generator circuits.

12. A signal generator circuit for providing a signal which progressively cyclically increases and decreases in finite steps to resemble a sinusoidal waveform, the signal generator circuit comprising: at least two bridge circuits each including two pairs of series connected current control means connected across the terminals of a source of DC voltage, each bridge circuit having a pair of output terminals at the juncture of the current control means of each of said pairs of current control means, a pair of signal generator output terminals, means connecting said output terminals of the bridge circuits and said signal generator output terminals in mutual series circuit relation, signal means for cyclically rendering the noncorresponding current control means of the pairs of current control means of each bridge circuit conductive and nonconductive sequentially and in different combinations to produce different rectangular topped pulse output waveforms at the output terminals of the bridge circuits, which waveforms respectively comprise positive and negative going pulses of different widths so as to form a progressively increasing and decreasing stepped waveform, and each of said current control means of each bridge circuit being capable of conducting current in both directions, so the zero output condition of one bridge circuit or the flow of an out-of-phase inductive current will not block the flow of current to the output terminals of the generator circuit.

13. The signal generator circuit of claim 12 wherein each of said current control means comprises a unidirectional current control device which is arranged so the current for said source of DC voltage passes freely therethrough when said control means allows the same to conduct, and a rectifier device in parallel with the associated current control device arranged to pass current in the reverse direction.

14. The signal generator circuit of claim 12 wherein each of said current control means is a transistor with load and control terminals and having substantial gain in both directions of current flow through the load terminals, and said signal means include a source of voltage for selectively coupling positive and negative voltages to the control terminal thereof.

15. The signal generator circuit of claim 12 wherein said signal means operates said current control means of each bridge circuit to produce outputs which are of the same polarity or zero at any instant, so the resultant signal fed to the load is equal to or greater than the values of each output.

16. The signal generator circuit of claim 12 wherein there is a different source of DC voltage connected to said at least two bridge circuits with the voltage output of one of same being substantially greater than the voltage output of the other of same, and said signal means associated with the bridge circuit having the source of DC voltage having the lower voltage output operating the current control means each half cycle so the outputs of the bridge circuits varies from zero to voltages of opposite polarity while the outputs of the other bridge circuit is zero or a voltage of one given polarity.

17. The signal generator circuit of claim 12 wherein there is a different source of DC voltage connected to said at least two bridge circuits with the voltage output of one of same being substantially greater than the voltage output of the other of same, wherein the output of one of the bridge circuit associated with the source of DC voltage with the lower output is zero when said corresponding current control means thereof are both simultaneously conductive or nonconductive and $+V_1$ and $-V_1$ when the two different noncorresponding current control means are respectively conductive, and wherein the output of the bridge circuit associated with the source of DC voltage with the higher output zero when said corresponding current control means thereof are both simultaneously conductive or nonconductive and $+V_2$ and $-V_2$ when the two different noncorresponding current control means are respectively conductive, and said signal means of the bridge circuits operating the current control devices thereof each cycle of the output of the generator circuit to produce the following simultaneously occurring pairs of outputs of the two bridge circuits in the sequence indicated: $0+0$, $0+V_1$, $+V_2-V_1$, $+V_2+0$, $+V_2+V_1$, $+V_2+0$, $+V_2-V_1$, $0+V_1$, $0+0$, $0-V_1$, $-V_2+V_1$, $-V_2+0$, $-V_2-V_1$, $-V_2+0$, $-V_2+V_1$, $0-V_1$ and $0+0$.